United States Patent [19]

McKeehan et al.

[11] Patent Number: 5,920,863

[45] Date of Patent: Jul. 6, 1999

[54] SYSTEM AND METHOD FOR SUPPORTING TRANSACTIONS FOR A THIN CLIENT LACKING A PERSISTENT STORE IN A DISTRIBUTED OBJECT-ORIENTED ENVIRONMENT

[75] Inventors: Michael Dennis McKeehan; Teresa Chung Kan; Kenneth James Lawrence, all of Rochester, Minn.

[73] Assignee: International Business Machines Corporation, Armonk, N.Y.

[21] Appl. No.: 08/866,955

[22] Filed: May 31, 1997

[51] Int. Cl.$^6$ .................................................. G06F 17/00
[52] U.S. Cl. ..................................... 707/10; 707/6; 707/8
[58] Field of Search ................... 380/23, 4; 395/183.11, 395/675, 500, 200.31, 671; 707/8, 10, 6

[56] References Cited

U.S. PATENT DOCUMENTS

| | | | |
|---|---|---|---|
| 5,341,429 | 8/1994 | Stringer et al. | 380/23 |
| 5,363,121 | 11/1994 | Freund | 395/600 |
| 5,428,771 | 6/1995 | Daniels et al. | 395/575 |
| 5,432,926 | 7/1995 | Citron et al. | 395/575 |
| 5,499,367 | 3/1996 | Bamford et al. | 707/8 |
| 5,504,900 | 4/1996 | Raz | 707/10 |
| 5,561,763 | 10/1996 | Eto et al. | 395/183.11 |
| 5,561,797 | 10/1996 | Gilles et al. | 395/600 |
| 5,586,312 | 12/1996 | Johnson et al. | 707/10 |
| 5,642,417 | 6/1997 | Stringer | 380/4 |
| 5,680,610 | 10/1997 | Smith et al. | 707/10 |
| 5,687,372 | 11/1997 | Hotea et al. | 395/675 |
| 5,689,560 | 11/1997 | Cooper et al. | 380/4 |
| 5,696,966 | 12/1997 | Velarde | 707/10 |
| 5,701,480 | 12/1997 | Raz | 395/671 |
| 5,724,556 | 3/1998 | Souder et al. | 395/500 |
| 5,764,897 | 6/1998 | Khalidi | 395/200.31 |

OTHER PUBLICATIONS

Boutros et al., "A Two-phase Commit Protocol and Its Performance", IEEE, Sep. 9–10, 1996, pp. 100–105.
Jorge F. Garza. Won Kim, "Transaction Management in an Object–Oriented Database System", ACM press, vol. 17, No. 3, Sep., 1988, pp.: 37–45.
*Transaction Manager Concepts*, Two–Pahshe Commit: Making Computations Atomic, pp. 562–574.

*Primary Examiner*—Wayne Amsbury
*Assistant Examiner*—Thuy Pardo
*Attorney, Agent, or Firm*—Robert Kevin Perkins; Lawrence D. Maxwell

[57] ABSTRACT

A system, method, and apparatus for enabling a thin client to participate in a global transaction in a distributed object-oriented transaction processing environment that commits resources according to a two-phased commit protocol. The thin client is configured with a pseudo-transaction manager (PTM), and a remote server managing the commit procedure is configured with an object transaction manager having an interface to the (PTM). When an application on the thin client sends a request to begin a transaction, the PTM creates a temporary propagation context including a Global ID identifying the transaction and sets a flag in the context to indicate that this is a new transaction. The context is sent to a remote server for execution of a remote method. Upon receipt, the remote server recognizes that this is a new transaction and creates a real propagation context including its Resource Coordinator Proxy ID, the global ID, and a Recovery Coordinator Name useful for a recovery process in the event of transaction failure. The real context is replied to the PTM, which updates and replaces its temporary context with the real context. The real context is then sent to any downstream remote server participating in the global transaction, and each (Subordinate) registers to the Resource Coordinator identified in the context. The real context containing the Global ID generated by the thin client is used by the PTM for requests to any servers involved in the transaction, while the remote server manages the two-phase commit procedure.

18 Claims, 10 Drawing Sheets

SYSTEM AND METHOD FOR SUPPORTING TRANSACTIONS FOR A THIN CLIENT LACKING A PERSISTENT STORE IN A DISTRIBUTED OBJECT-ORIENTED ENVIRONMENT

BACKGROUND OF THE INVENTION

1. Field of the Invention

The present invention relates generally to supporting transactions in a distributed object-oriented computing environment, and more specifically to a system and method implemented in such an environment for allowing a thin client to start and coordinate a global transaction using a two-phase commit procedure.

2. Description of the Related Art

During the 1960's, when computers began to become a permanent and widespread feature of the business environment, the accepted model for computing was a large mainframe computer, such as the IBM 360, acting as a host or server providing computer services for a large number of dumb terminal clients. Following that trend into the 1970's, that model became the standard with the advent of operating systems such as the Virtual Machine (VM) operating system, running on computers such the IBM 370. Mainframe computers of that era typically shared characteristics including a large main memory space, an extensive repertoire of instructions, fast operations, and considerable cost. The mainframe's operating system allowed each user to access the mainframe from a terminal having limited hardware and software intelligence on a time-sharing basis. With the high cost/high capability of the host making for a relatively rich server, it only made sense to have low cost/low capability of relatively "thin" clients.

With the advent of the personal computer, and its virtual explosion of popularity following the introduction of the IBM Personal Computer (IBM PC) in 1981, the computing model began to change. Through the 1980's personal computers grew in popularity and the price of computing hardware, including memory, dropped dramatically. The model for computing shifted to accommodate powerful user-centralized systems, as individual users harnessed more and more raw computing power on their desktops. The need for centralized management and control of resources such as printers and certain software, still left a place for a host/ or server/client providing access to many clients. However, the clients were no longer dumb terminals, instead the clients were relatively powerful themselves, having large capacity main memory as well as storage memory, usually in the form of a well known hard disk. Thus the server/client model commonly became one involving, relatively speaking, "fat" clients.

The 1990's have witnessed a growing popularity of the Internet and the world wide web, a multimedia subset of the Internet. The Internet serves as a worldwide network linking computers all over the globe to each other. Many have predicted that the Internet will once again change the model of computing back to a server hosting a lot of dumb terminal clients. The rationale is that the accessibility of software over the Internet will make the need for a powerful desktop computer fade away. Instead software can be accessed on demand and the remote server or servers will perform the requested functions and provide access to the requested resources. Thus, the client computing model has once again turned to the need to support thin clients. Such modern thin clients have little need for very much electronic or main memory and practically no need for a hard disk.

The computing model for many servers over the Internet serving a plurality of thin clients is attractive because it reduces the cost of ownership for computer users and reduces the threat of their workstations becoming obsolete due to computer programs requiring more and more memory for execution. The memory demands may now be satisfied at the servers while the same thin clients may be used for years to come.

Unfortunately, new problems are created for thin clients when they are included in the worldwide environment of distributed transaction-oriented computers. In a general sense a transaction in a computing environment is an exchange between one computing entity and another that accomplishes a particular action or result. For example, the entry of a customer's deposit and the updating of the customer's balance is a single transaction from the customer's point of view but involves a group of changes by an application transaction program that handles the transaction. One or more application transaction programs must interface with database files, referred to as resources, that have their own management software (resource managers) to access data and make changes to it. A procedure having specific rules, known as a commitment control protocol, ensures that a group of changes made to different database files, such as the above-referenced deposit and balance files, are synchronized so that multiple files all reflect the transaction.

It's estimated that, by the year 2000, business worth 600 billion dollars will be transacted over the Internet alone. This trend toward ever-increasing electronic commerce means that more resources will be distributed over networks globally accessible over the Internet, and continue to be spread over local area and wide area networks. Typically, in distributed computing environments, the commitment control procedure requires that each piece of transaction management software synchronize with the other transaction management software involved in the encompassing transaction taking place over the network. This synchronization ensures that data is not changed in any databases until all are in agreement that the change will be considered permanent.

The synchronization ensures the integrity of business processes and data by enforcing an "all or nothing" methodology. Each transaction is processed in its entirety, or not at all. This is sometimes referred to as atomicity. If a failure occurs during processing, the synchronization protocol will recover to the state before the request arrived, allowing the transaction to be retried if appropriate. The specific mechanism enforcing this behavior is a software component known as the transaction manager. When an application accesses multiple resources such as files, databases, and message queues, the transaction manager coordinates the updates to these resources, ensuring that either all updates are performed together or none are performed. It uses a method known as the two-phase commit procedure to achieve this. The two-phase commit procedure includes a voting phase in which resource manager indicates that his resource is prepared to commit, and a commit phase indicating that the data has been changed or updated. If the voting phase indicates a problem the data is not committed and the transaction does not occur.

A transaction manager component exists for each system that manages a resource along with resource management software that is responsible for managing the resource. The transaction manager is the controlling entity of the two management software entities. But there is a trend toward computers that are essentially network workstations that operate software that is passed to them over a network such as the Internet or an entity's smaller internal version of the same, called an intranet. Such workstations do not have their own storage, such as hard disk drives, and therefore cannot store their own data. Therefore such workstation machines cannot include their own data in transactions, which is a limitation of the prior art workstations. Without their own datastore, they have no way to guarantee that their data will remain in synch with data being changed on other computers that have such a store and which participate in the transaction.

The above-described problem is more complex in a distributed "object-oriented" environment. Objects are becoming very popular with computer programmers because their use can greatly reduce software development time and expense. In object oriented programming, program code may be inherited from objects as long as there is an underlying system, sometimes referred to as a framework that supports the objects and allows the inheritance to take place. The object encapsulates or contains properties such as certain executable code and data that is consistently reusable whenever a procedure or method is performed on the object. To ensure that they retain their properties, objects need to be saved in non-volatile locations, such as disk storage, where they are managed by resource management software, such as a relational database manager or object database manager. This is referred to as persisting the object. Thus, an advantage of objects is that one representation of an object persisted in disk memory may be used in by various site's application programs.

A disadvantage for the programmer who is concerned with ensuring the integrity of distributed transactional data involving client applications from network workstations not having their own persistent store is the inability to synchronize data through the use of a two-phase commit protocol.

Prior art transaction managers relied on the client's persistent storage to track the state of resources involved in a transaction in the event of failure so that the resources could be recovered. Therefore, clients having no persistent storage were not allowed to start a transaction that used a two-phase commit procedure. It would be an advancement in the art to provide a mechanism for allowing a thin client to start a global transaction while ensuring that atomicity is maintained.

SUMMARY OF THE INVENTION

An objective of this invention is to ensure atomicity in a distributed transaction processing environment.

A further objective of this invention is to provide such atomicity in such an environment wherein resources requested by a thin client application for a global transaction are distributed among a plurality of servers in which a two-phase commit protocol is used.

A still further objective is to meet the above objectives when such a global transaction is started by a thin client.

To meet the objectives described above, and to overcome the problems described above, and those which will become apparent upon reading the detailed description below, a new system and method is provided, wherein the system includes logic, preferably implemented as computer software for carrying out the method this invention. The method includes the steps of creating a temporary context on a thin client in response to an application requesting to begin a global transaction, wherein the temporary context includes a thin client generated unique global transaction identifier (Global ID) to associate with the global transaction and a flag to indicate to a remote server receiving it that this is a new transaction. When the first remote operation is executed, the temporary transaction context is sent to a first remote server supporting a two-phase commit protocol, which recognizes itself as the Root Server and its transaction manager as the root transaction manager (Root TM). The Root TM creates a real propagation context containing the Global ID, its Resource Coordinator Proxy, and its Recovery Coordinator name useful in the event that recovery is needed due to a failed transaction. The real propagation context is replied back to the thin client which then updates and replaces its temporary transaction context including the Global ID and a flag to indicate that the first remote server will become the Root Server. The temporary context is replaced with the real context at the thin client. The real transaction context containing the Global ID generated by the thin client is used by the pseudo-transaction manager for additional requests to servers. However, registration and Commit operations are managed by the root transaction manager.

Any number of downstream remote servers may be included in the global transaction, and each downstream subordinate server registers with its immediate upstream server. In such a case, the Superior Resource Coordinator Proxy will be that of the immediate upstream server's proxy. In general, an upstream server passes its own Resource Coordinator Proxy to a downstream subordinate, which then registers with that upstream server.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

The present invention is described in a preferred embodiment as being computer software. Nevertheless, in view of the teachings herein, it will occur to those skilled in the art that all or portions of the invention, and in particular that identified herein as computer-executable logic, may be implemented in computer hardware or a combination of hardware and software (i.e., firmware), as well as being implemented as computer software.

The present invention includes a computer system and a procedure, preferably implemented with computer software, that employs a pseudo-transaction manager for allowing a thin client to start a global transaction that uses a two-phase commit protocol, and then send transaction requests to downstream servers while maintaining atomicity and other data integrity properties, referred to as ACID properties discussed below.

Regarding terminology, "upstream" and "downstream" are used to refer to the flow of data among servers, such that the first server contacted is upstream of the next one contacted, which is in turn upstream of a third one contacted but downstream of the first. Each immediate upstream server is a Superior to its immediate downstream server neighbor, which in turn is the Superior's Subordinate. However, the first remote server contacted by a client and requested begin a distributed transaction is always the Root Server, but the Root Server may also have an immediate downstream server that is its subordinate.

Generally, in a distributed transaction processing environment, there are multiple servers and multiple layers of coordination. However, the present invention is useful particularly for allowing a thin client to coordinate a transaction request replied from the Root Server to other Subordinates downstream, and thus involves only the first layer. A second layer of coordination is typically needed in transactions that doesn't involve the client with the exception of call back from the different servers. Only the first layer of coordination is changed by this invention, and therefore the invention is described only with reference to the coordination of the transaction request replied from the Root Server. Nevertheless, one skilled in the art may apply this invention to other layers and still be within the spirit and scope of the invention.

Two-phase Commit Protocols for Distributed Transactions

Figure 1A:
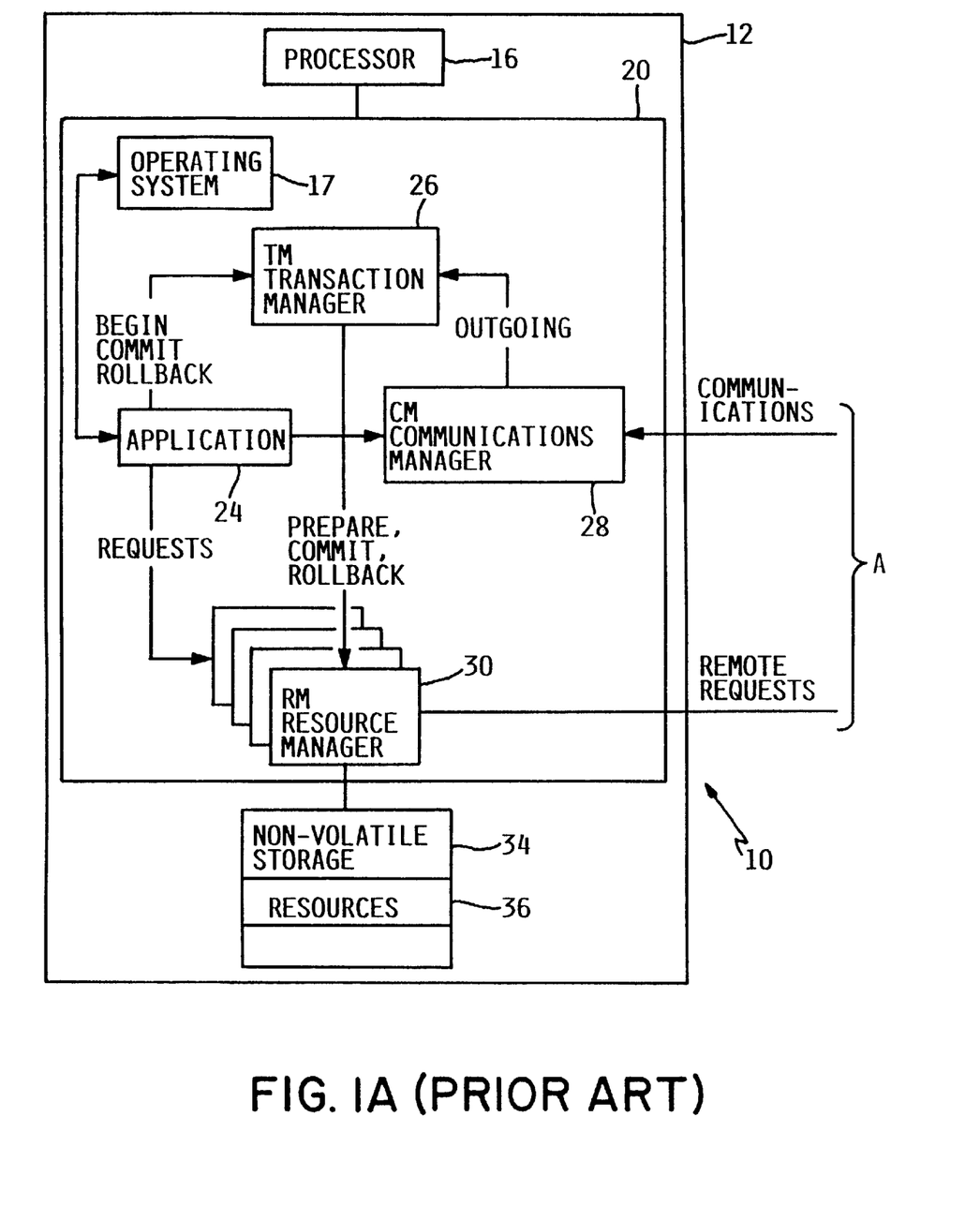
FIG. 1 is a simplified overview of a prior art distributed transaction computing environment over which the invention offers improvement.
Figure 1B:
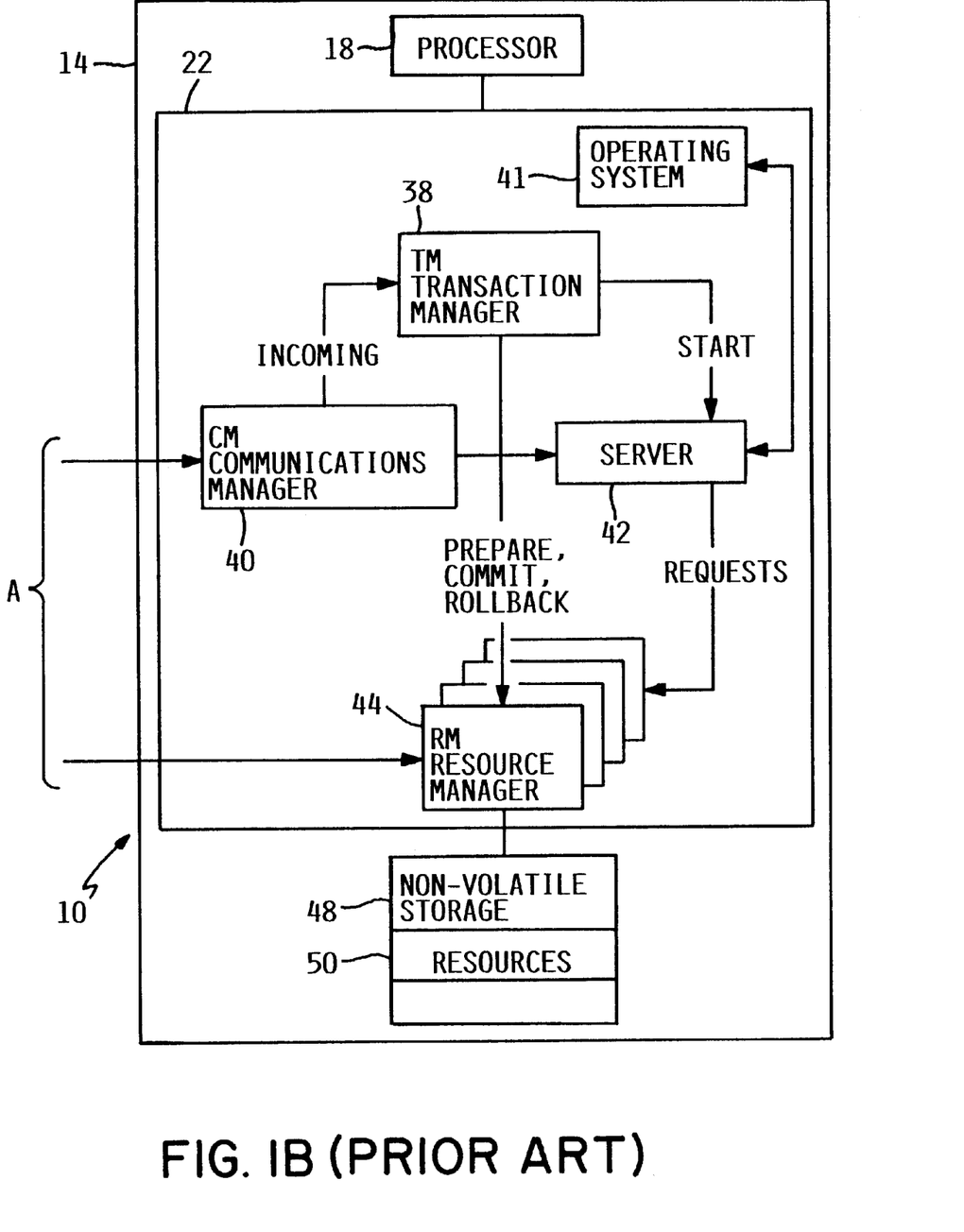

FIG. 1 shows a prior art distributed transaction environment, for which transaction-related improvements are provided by the present invention and which are discussed below. Generally speaking, a transaction is defined in the well-respected work, *Transaction Processing, Concepts and Techniques*, by Jim Gray and Andreas Reuter, ISBN 1-55860-190-2, as a collection of operations on the physical and abstract application state. In that regard, with reference to FIG. 1, a global transaction in distributed transaction computing environment 10 refers to a transaction involving data resources throughout the distributed environment. In this environment, a global transaction comprises a unit of work that consists of operational execution by transaction application program (application) 24 initiated with a Begin_Transaction, i.e. begin transaction operation. The transaction may include reading or modifying the data resources 36, and 50 involved in the transaction, and stored on non-volatile storage 34 and 48 respectively. The non-volatile storage may be for example well-known disk storage.

The application program, as well as various other programs, described in detail below and including transaction manager (TM) 26, Communications Manager 28, and Resource manager 30 operate in random access memory (RAM) 20 which operates under control of a processor 16 communicating with an operating system 17 in random access memory 20. RM 30 controls access to resources from and to storage 34, and CM 28 handles communication with computer system 14 by communicating with CM 40. System 14 includes RAM 22, in which operates an operating system 41, TM 38, CM 40, and RM 44. The operating system may be similar or different. For example, both systems may have IBM's OS/400 operating system, or one may have Microsoft's Windows NT operating system. It also includes a Server program 42 for responding to client-requests to its RM 44 from RM 30 of system 12. RM 44 manages resources on nonvolatile storage 48, which may also be well-known disk storage.

The (TM) 26 receives the Begin_Transaction request from Application program 24 that initiates the transaction, and it ends with either a Commit or Rollback operation. A Commit operation signals successful termination of a transaction, while a Rollback operation denotes unsuccessful termination of a transaction due to abnormal circumstances.

The Commit and Rollback operations are employed to ensure that the transaction has atomic, consistent, isolated, and durable (ACID) properties. Atomicity means that changes to the state of resources involved in a transaction either all occur or none of them occur. Accordingly, a transaction either succeeds or fails. If it succeeds, the results of the transaction are made permanent (committed). On the other hand, if the transaction fails, all effects of the unsuccessful transaction are removed (backed out). For example, a banking debit transaction is atomic if it both dispenses money and updates your account (all changes to the resource occur). Consistency means that a transaction is a correct transformation of state. Returning to the example, the banking debit transaction is consistent if the money dispensed is the same as the debit to the account. Even though the transactions execute concurrently, it must appear to each transaction that it is acting in Isolation. In other words, the application 11 must be unaware of other programs reading and writing the account (resource) concurrently. For example, the banking debit transaction must be unaware or isolated from a concurrent deposit that a joint owner is making to the account. Finally, Durability ensures that once a transaction completes successfully (i.e., Commits), its change to the state of the resource survives failures to system 10. For example, if the transaction is durable, once it is complete, the account balance reflects the withdrawal, even if system 10 fails.

The Commit Procedure is the primary mechanism for the TM to enforce ACID properties on transactions. The Transaction-oriented systems include recovery procedures that are part of TM 26 that maintain the ACID nature of transactions and re-establish system operation after failure. TM 26 has primary responsibility for managing the transaction because it received the application's request to begin a transaction first, i.e. before any other TM in the environment.

In a transaction-oriented system 10, transactions may occur either on a single computer system, such as system 12 independently, or on a distributed basis, on both system 12 and 14. In a distributed transaction encompassing resources on both system 12 and 14, a transaction may cause changes to be made at more than one site. In such a system, atomicity can be guaranteed only if all of the sites involved in the transaction agree on its outcome. As described in the above-referenced *Transaction Processing* textbook, distributed transaction systems can use a transaction synchronization procedure called two-phase commit protocol to guarantee atomicity, and the other ACID properties.

Following is an example to illustrate the two-phase commit protocol. When a transaction ends successfully at execution site 12 executing such a two-phase commit protocol, TM 26 requests that all resource management software, i.e. RM 30 and 44, commit or make permanent all data operations involved in the transaction. In the first phase of the protocol, RM 30 and 44 are requested to prepare to commit. In response, each RM individually decides or "votes", based upon local conditions, whether to Commit or Rollback out their operations. The decisions are communicated to a synchronization location where the "votes" are counted. In the second phase, if all sites vote to Commit, a request to Commit is issued by the transaction manager, in response to which all of the RM's commit their operations. On the other hand, if any site votes to Rollback or back out of its operation, all sites are instructed to Rollback their operations and the transaction does not occur. Thus, the ACID properties are ensured throughout the distributed environment.

A problem, to which the present invention is directed to solve occurs when a client application having no persistent store needs to start a global transaction that uses a two-phase commit protocol. In prior art environments using a two-phase commit procedure to ensure ACID properties are maintained for all distributed resources involved in a global transaction, a client without a persistent store is not allowed to start or participate in the transaction. A persistent store refers to the logical file structure, for example Posix files, physically stored on non-volatile storage, such as non-volatile storage 34. The reason for the restriction of the prior art is that the transaction manager relied on the client's persistent storage to track the state of the transaction across failures. The transaction manager required persistent storage in order to ensure that ACID properties are maintained. This invention removes such dependency on client persistent storage, and allows participation by thin clients in global transactions using a two-phase commit procedure.

Overview of Operation of Present Invention

The present invention addresses the above-described problem directly by providing a mechanism for supporting a two-phase commit procedure in a distributed transaction computing environment in which a thin client participates. Generally, the term thin client refers to a computing station having no persistent store. The invention has particular advantages within an object-oriented environment, but one skilled in the art will recognize its usefulness in a procedural environment.

Computer System for Implementing the Invention

Figure 2A:
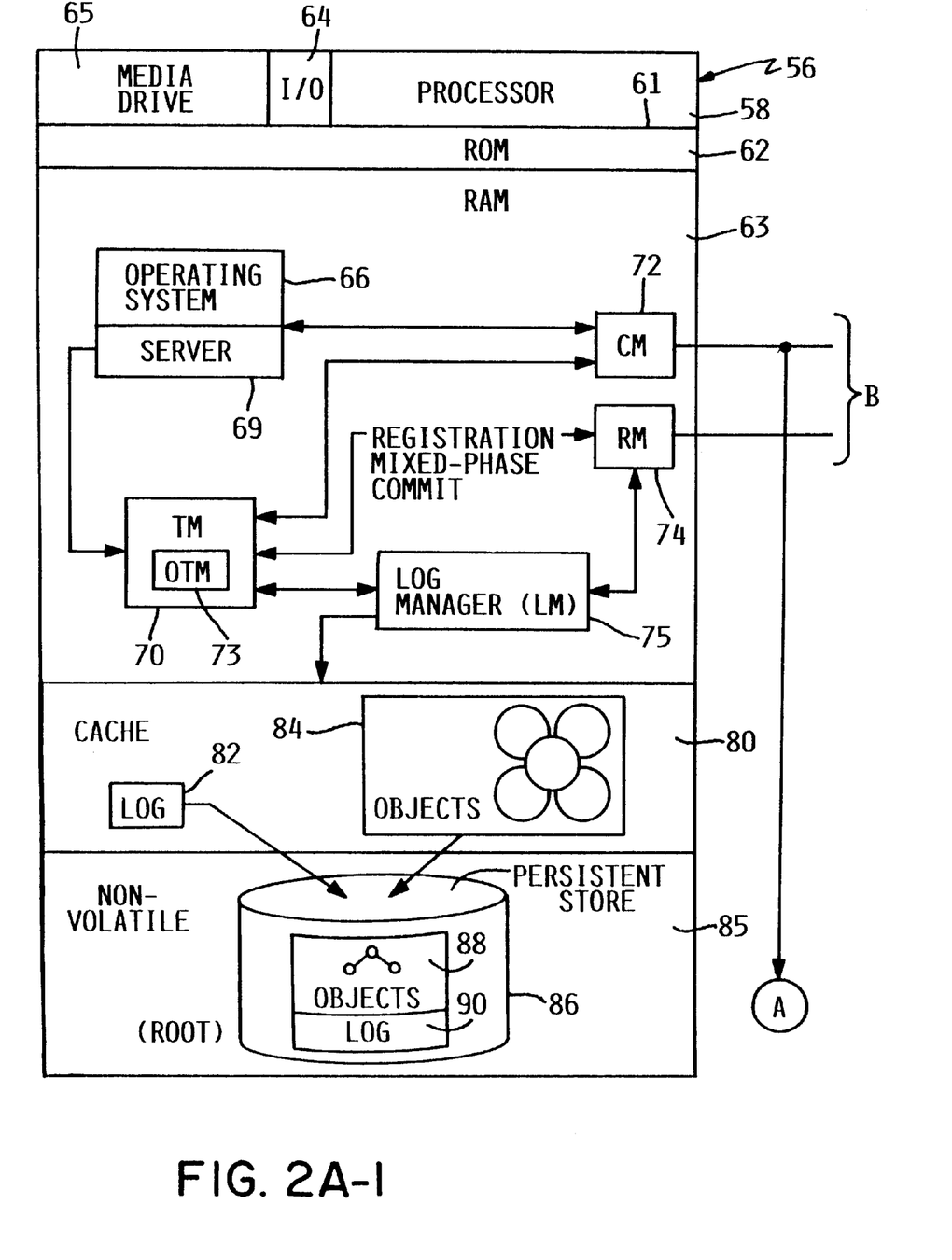
FIGS. 2A and 2B together show a simplified block-diagram of a distributed transaction object-oriented computing environment including a thin client for which the present invention is useful.
Figure 2A:
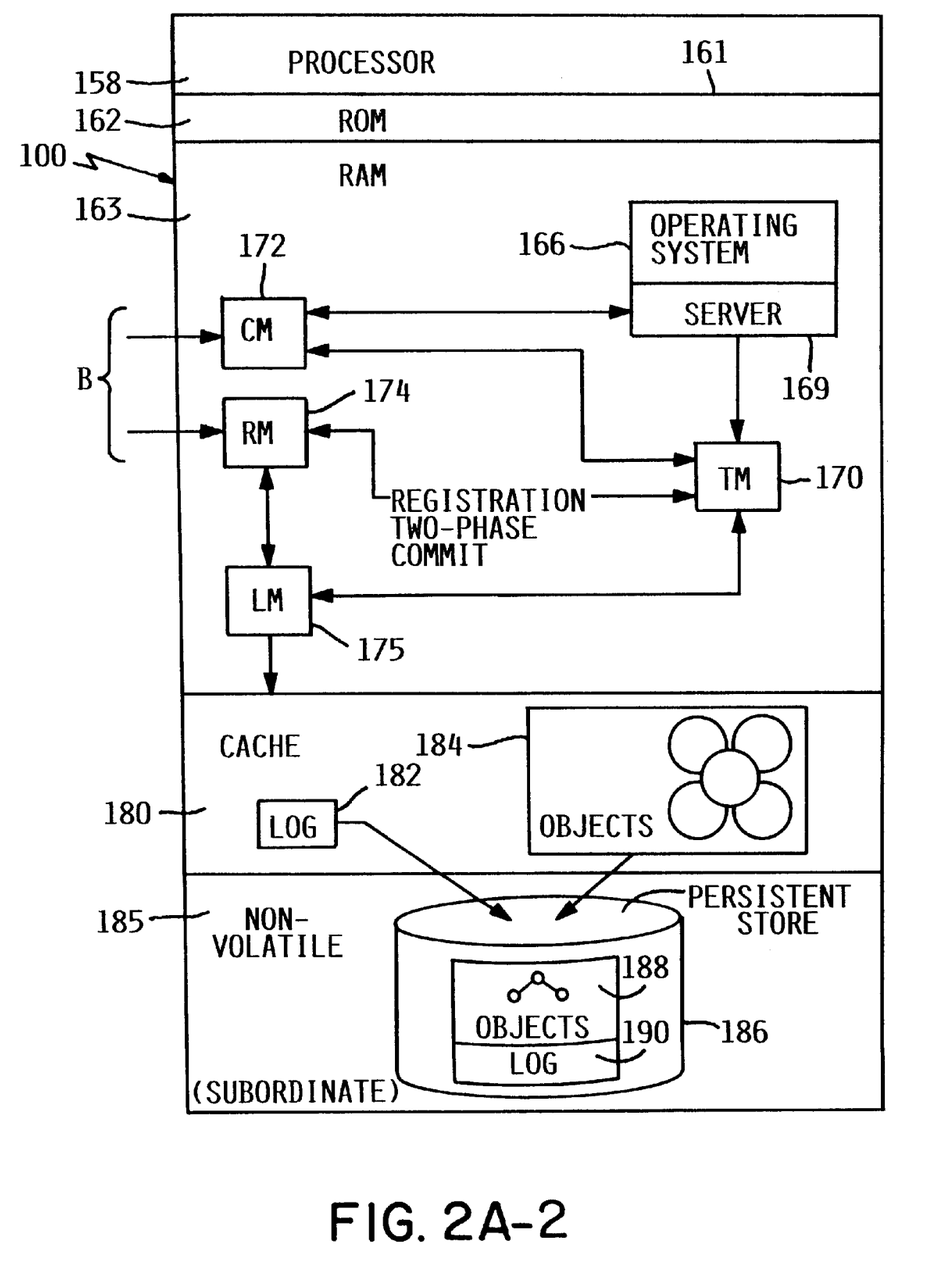
Figure 2B:
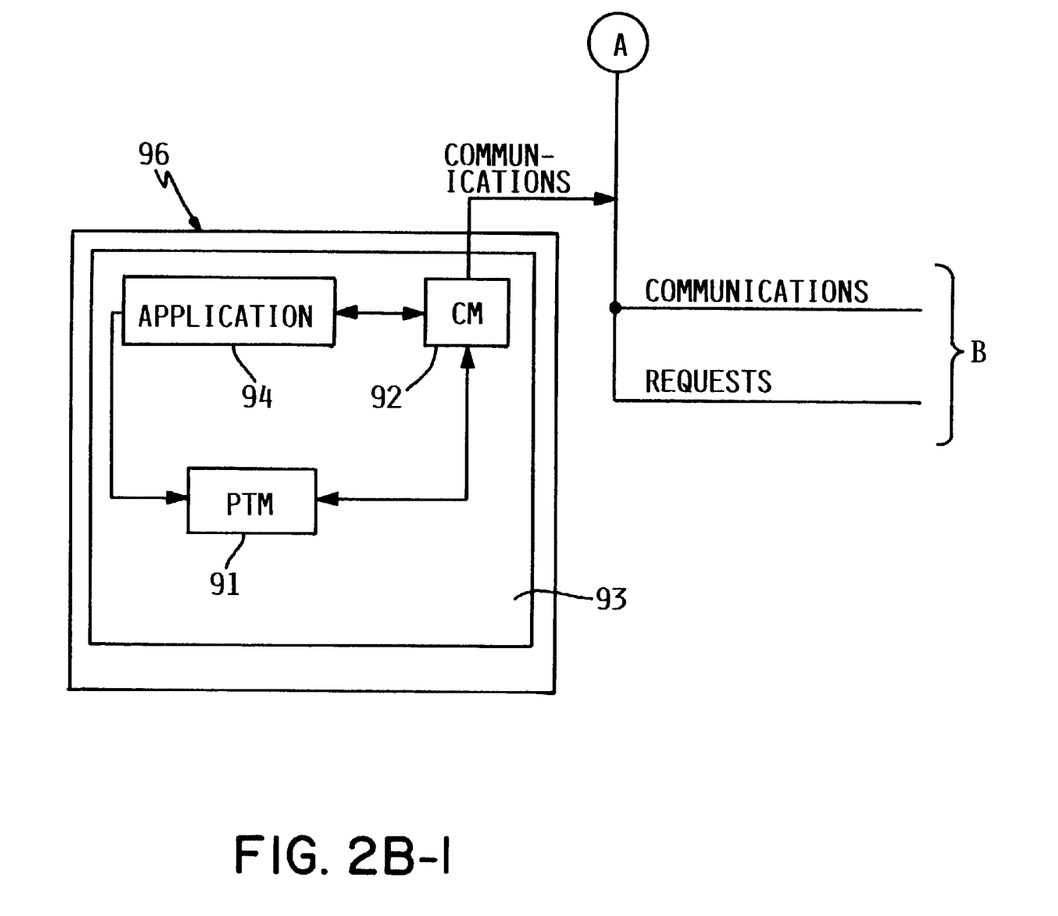
Figure 2B:
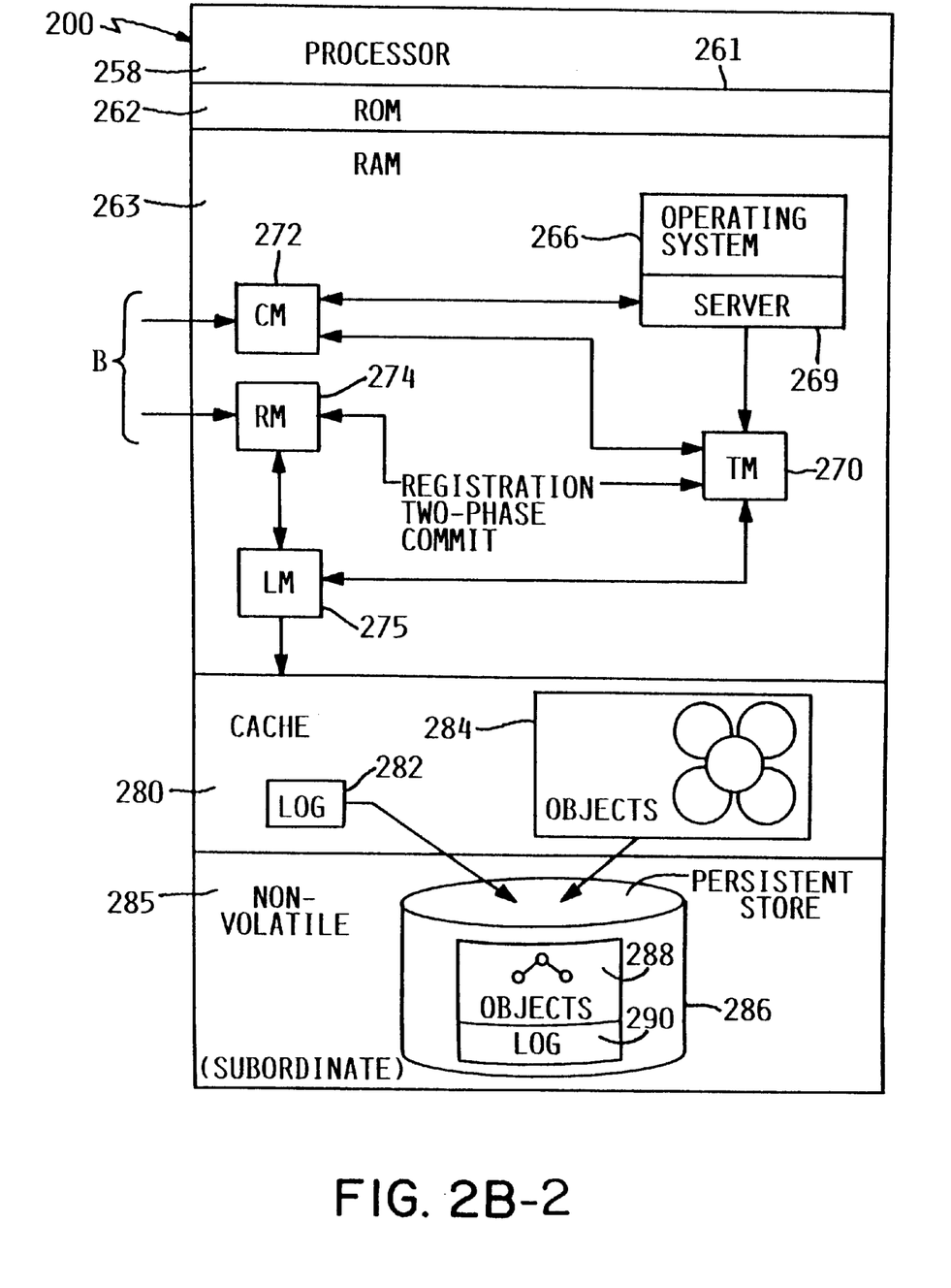

FIGS. 2A and 2B together show a simplified block-diagram of a distributed transaction object-oriented computing environment in which the present invention is useful for overcoming the problems and providing the advantages described above. In general, computer system 56 (FIG. 2A) is configured with the transaction manager (TM) 70 of the present invention, which includes for the first-time an object transaction manager (OTM) 73 which is capable of supporting two-phase commit protocols for global transactions involving distributed object resources, including those distributed on network workstations having no persistent store. Such a workstation is denominated as a "thin computing box." Separate system 96 (FIG. 2B) is such a thin computing box. Object resources on computer systems 100 (FIG. 2A) and 200 (FIG. 2B) supporting a two-phase commit protocol may also be included in the global transaction. The client application program 94 on system 96 may invoke a Begin__Transaction operation to start a global transaction on behalf of the application. When the first remote operation reaches to the server program 69 on system 56, that invokes its transaction manager 70 to carry out the global transaction in the networked environment 52. When such an operation is received at site 56, that site is designated by TM 70 as the Root Server, and other servers, i.e. computer systems 100 and 200, involved in the global transaction become Subordinate servers to the Root Server. Accordingly, TM 70 is designated as the Root TM. System 100 and 200 each support the two-phase commit procedure because each has a persistent datastore and transaction manager software.

For the first time in a distributed object-oriented transaction computing environment, an application resources existing on a system, such as system 99, having no persistent datastore may fully participate in the global transaction due to the methods enabled by the new logic of this invention, discussed in more detail below.

Computer system 56 includes a processor 58, main memory 61, and durable or non-volatile storage, e.g, disk storage. Computer system 56 may be a well-known personal computer, such as those manufactured by IBM Corporation, or a mid-range computer, such an IBM AS/400. Accordingly, the processor 58 may be a microprocessor, such as the Intel Pentium, or a proprietary processor for such a mid-range computer as the IBM AS/400. Media drive 65 is useful for allowing computer-readable data mediums to be used to communicate with processor 58. Such media drive, may include tape drives, optical media drives, such as CD-ROM drives, and well-known floppy diskette drives. Input/Output 64 may be used to communicate with peripheral devices, such as a keyboard, mouse, or display (not shown). Main memory 61 may include read only memory (ROM) 62, and random access memory (RAM) 63, and cache memory 80. Of course, Main memory 61 is shown in simplified arrangement, and it should be understood that it may also include other well-known memory, such as DRAMS and flash-memory. Cache memory 80 holds certain data, according to well-known memory-allocation algorithms, such as least recently used, for quick access before physical writing to non-volatile memory 85. Non-volatile memory 85 refers to the physical data storage in which logical data, including a logical persistent store 86, is stored for purposes of being able to recover data, including object cluster 88 (a group of one or more objects), upon transactional or system failure. Services provided by log manager (LM) 75 are used by TM 70 to write entries in log 82 in cache and its sibling persistent version 90 in the persistent store 86. The data that is written to the log allows the TM to track remote RM's and TM's involved in the transaction.

An operating system 66 may communicate and manage lower-level operations with programs, such as server program 69, and TM 70 through known means, including known application program interfaces (APIs) not shown. Operating system 66 may be OS/2, AIX, Unix, Windows-NT, or other well-known operating systems for personal computers and OS/400 for an IBM AS/400.

Computer systems 100 and 200, may be similar systems to computer system 56, but for simplicity some components shown on system 56 are not shown on those respective systems. Thus, processors 158, and 258, main memories 161 and 261 including ROM's 162, 262, RAM's 163, 263, and cache memory 180, 280, respectively, are also similar to those described above with reference to processor 58, and main memory 61. The handling of objects 184 and 284 through cache 180 and 280 and the respective storing of objects to object clusters 188, and 288, respectively, to persistent stores 186 and 286, respectively, is the same as described for the similarly numbered and denominated elements of system 56. Each persistent store is part of respective non-volatile stores 185 and 285 which are durable storage, such as disk memory, which are tracked by logs 182 and 282 in respective cache memory, and by persistently stored log 190 and 290 in the disk memory in the same way as described above for the respective similarly numbered and denominated elements of system 56. The logs are managed by respective log managers 175 and 275 on systems 100 and 200, respectively. Operating systems 166 and 266 operate in the same way and may be embodied in the same way as that described above for operating system 66 of computer system 56, described above. However, they could each be different from operating system 66. In other words, the type of operating system, such as OS/400 or Windows NT, does not limit the invention.

The present invention provides a mechanism to allow a thin client to start and coordinate a global transaction using a two-phase commit protocol. The mechanism includes the pseudo-transaction manager 91 (FIG. 2B) of the present invention, in cooperation with the Object transaction manager (OTM) module 73 on Root TM 70 of system 56 that is configured for interfacing with the PTM.

Regarding terminology, module is used in this specification to indicate that logic performing similar function, preferably embodied as software, may be grouped together. However, one skilled in the art will recognize that such grouping is merely a matter of convenience and choice, and therefore any functional logic, such as software, that operates to perform the method of this invention is within the scope of the invention regardless of how it is grouped, including not being grouped at all.

TM 70 communicates with Communication Manager (CM) 72 which in turn communicates with CM's 172, 272 and 92. The CM's 172 and 272 are primarily responsible for communicating with the respective server programs 169 and 269, respectively. Each CM also communicates with the respective TM's 170 and 270 on respective systems 100 and 200. Each Server program 169 and 269 also communicates with each respective server program on each respective system. TM 170 and 270 are considered Subordinate to Root TM 70, which is responsible for determining which resources may participate in a global transaction that is initiated by application program 94 on the thin computing box 96. The Root TM is determined by first Server program including a TM in the network contacted by such an application program, and therefore, in the case of the exemplary embodiment, TM 70 is the Root TM. When the application program 94 initiates the transaction, then its CM 92 must communicate this to CM 72 of system 56. Application program 94, and CM 92 operate in random access memory (RAM) 93 on system 96. A pseudo-transaction manager (PTM) 91 of the present invention that cooperates with OTM 73 of TM 70 for enabling the method of this invention also operates in RAM 93. It should be recognized that other application programs could be located on the other systems, but for simplicity only application program 94 is shown and discussed.

Client computer 96 running client application 94 in its RAM 93, has no non-volatile storage (i.e. it has no hard disk drive), and therefore cannot start or coordinate a global transaction without this invention. Without the PTM 91 of this invention, which in a preferred embodiment is software, the client 94 would not normally be allowed to participate in a global transaction because there would not be a way to track the state of the transaction across failures without the client's persistent store. For the first time, such resources can be included and committed according to a two-phase commit procedure by practicing the method of this invention.

Figure 3:
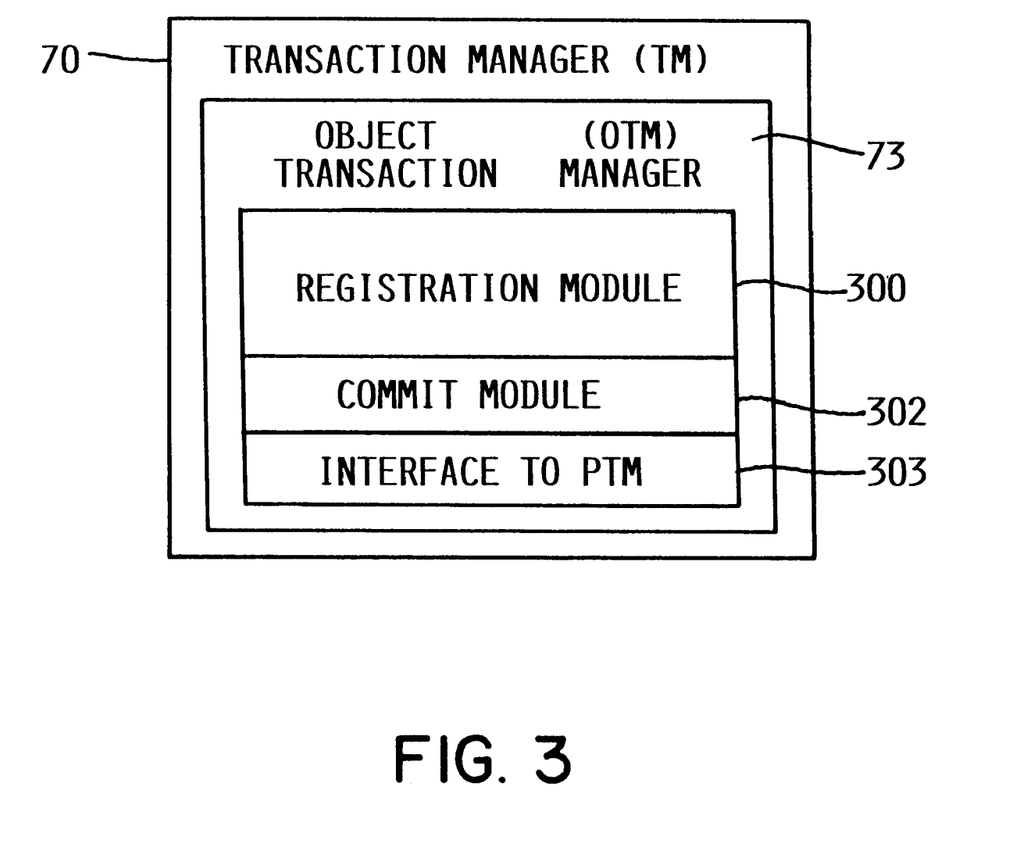
FIG. 3 is a simplified block-diagram of the logic of the transaction manager of the present invention including an object transaction manager module that operates within the computing environment of FIGS. 2A and 2B.

Referring now to FIG. 3, the TM 70 includes an object transaction manager (OTM) module 73, which itself includes a registration module 300 and a two-phase commit module 302, and a PTM interface module 303 for communicating with the pseudo-transaction manager. The registration module and commit module handle registration and commit functions in a close to identical fashion to similar services for transaction managers of the prior art. The PTM interface module handles the propagation context between the PTM and the Root TM. The propagation context is a data structure used for managing global transactions. Such a propagation context, useful for carrying out the process of this invention is described below with reference to FIG. 5. Each module is preferably implemented as software.

Figure 4:
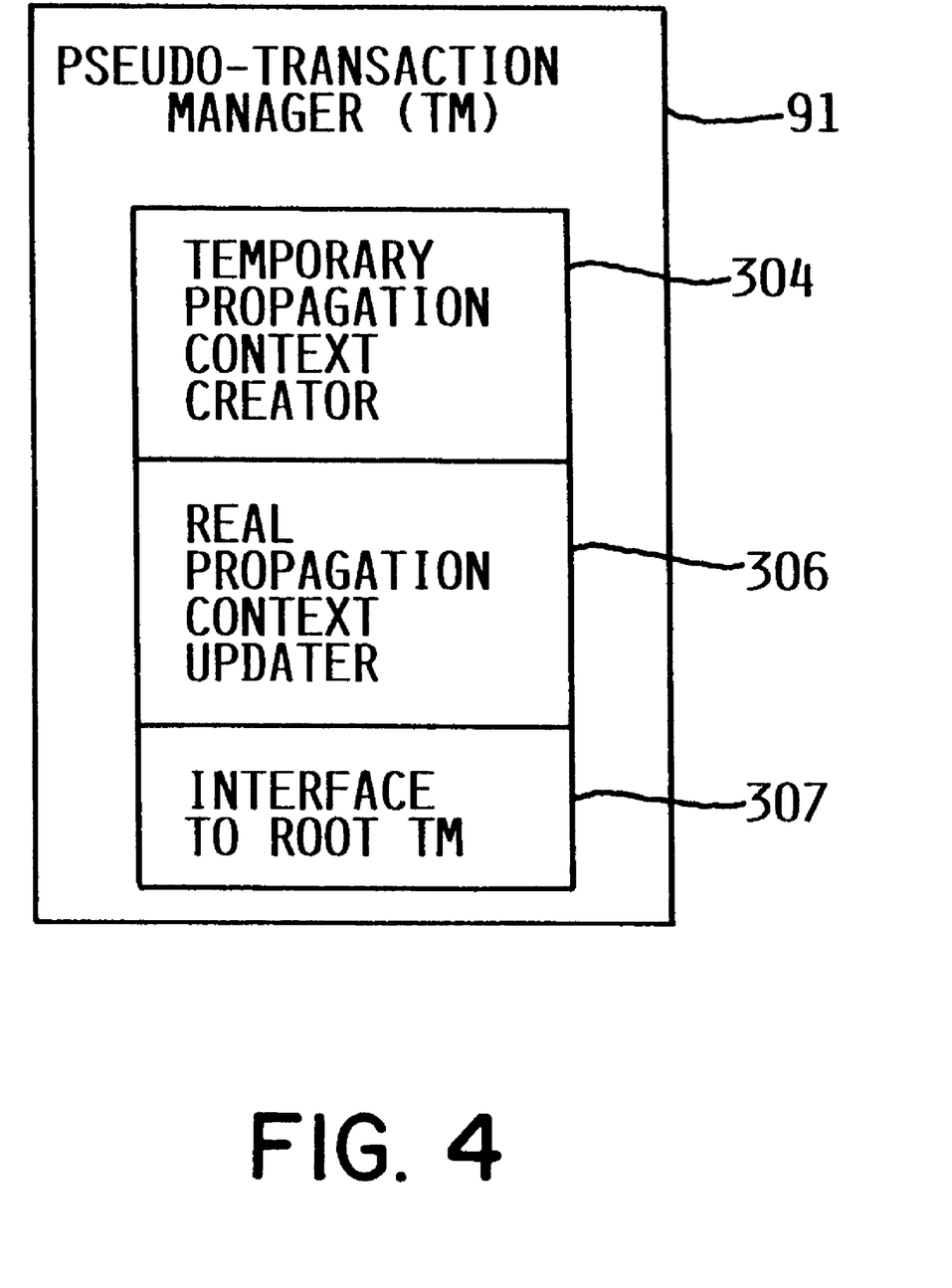
FIG. 4 is a simplified block-diagram of the pseudo-transaction manager of the present invention that interfaces with the object transaction manager module of FIG. 3 for performing the method of this invention.

The PTM 91 shown in FIG. 4, includes several modules, also preferably implemented as object-oriented software for carrying out functions to enable the methods of this invention. The modules include a temporary propagation context creator 304 and a real propagation context updater 306. An interface module to the Root TM 307 allows the PTM to communicate directly with the Root TM. The module 304 creates a temporary propagation context in response to a request from client application 94 (FIG. 2B) to participate in a global transaction with object resources located on servers in the environment 10. The lack of a non-volatile storage, and hence the inability to support a two-phase protocol is why such a system is not allowed in prior art environments to participate in a global transaction where the Root TM supports a two-phase commit protocol. Due to the new OTM 73 and PTM 91 the client application 94 on client system 96 may participate in a global transaction supported by a two-phase commit protocol. The OTM 73 and the PTM 91 are each preferably implemented in software code.

Figure 5:
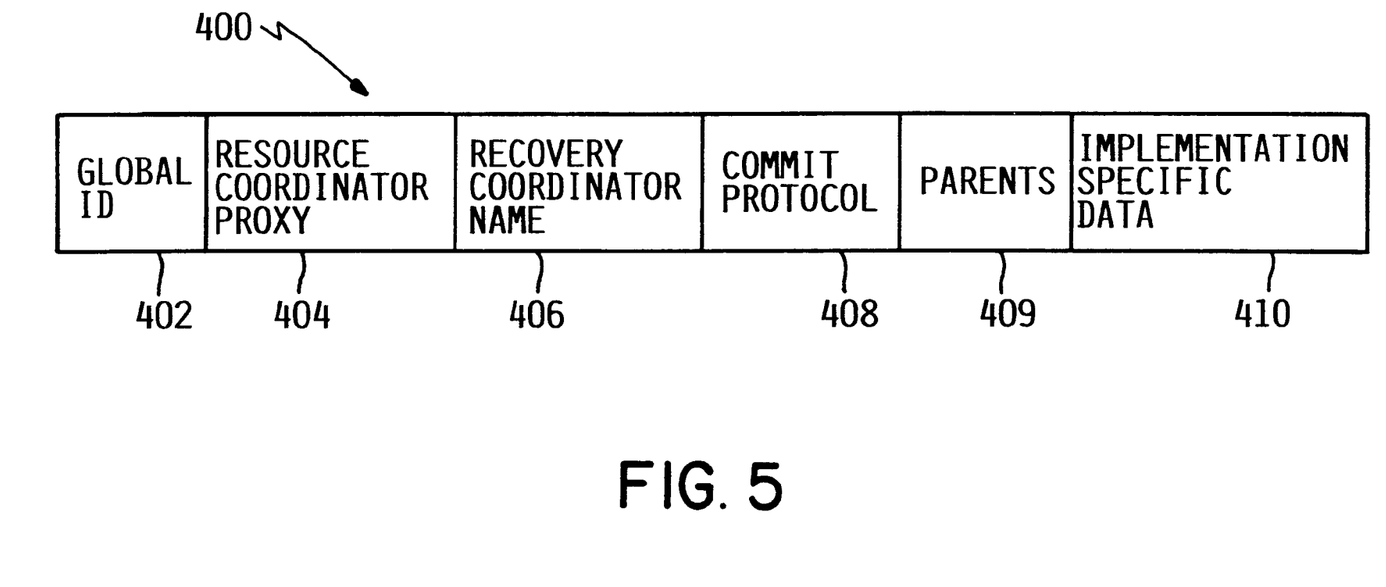
FIG. 5 shows a data structure useful with the object transaction manager module and the pseudo-transaction manager of FIGS. 3 and 4, respectively for allowing the thin client to participate in a global transaction in the distributed transaction object-oriented computing environment of FIGS. 2A and 2B.

FIG. 5 shows a data structure referred to as a general propagation context 400 which is the data structure passed among transaction managers participating in a global transaction. PTM 91 creates a temporary propagation context that is changed to a real propagation context by the Root TM 70 and then the temporary propagation context is updated at the client system 96 by PTM 91. Both the temporary propagation context and the real propagation context use the same data structure 400 but the field values are changed according to whether the context is temporary or real. Thus the propagation context 400 always includes the following fields: (1) a Global ID field 402 that identifies a particular global transaction; (2) a Superior's Resource Coordinator Proxy field 404 identifies the upstream Superior server's Resource Coordinator that is created by its TM and which handles registration, and which is set to Null by the client's PTM to indicate that the first remote server receiving the request will have the root TM; (3) a Recovery Coordinator Name field 406 that is used in the event that a recovery is necessary; (4) a Commit Protocol field 408 indicates the particular protocol supported, which in the case of this invention is always a two-phase commit protocol; (5) a Parents Field 409 that is used for nested transactions; and (6) an implementation specific data field 410, which is an optional field reserved for use by applications that require more data fields than the other five discussed.

Overview of Process of Invention

In general, the client PTM always has the Root Resource Coordinator's Proxy to coordinate a transaction. However, when the client begins a transaction, the PTM generates a Global ID which identifies a global transaction. The Resource Coordinator field 404 is set to Null in order to let the first receiving Server's TM recognize that this is a new transaction request. That Server TM then designates itself as the Root TM upon receipt of the temporary propagations content.

Once the global transaction is established by the Root Transaction Manager, the Resource Coordinator for the Root is established. In the example explained, with reference to FIGS. 2A and 2B, and 6, it happens to be the only Superior server in the environment. One skilled int he art will recognize that any server, other than the Root, can be subordinate to an upstream server and superior to a downstream server. Therefore, this invention is not limited by the examples which merely portray one possibility of a configuration of a distributed environment in which the invention is useful.

The Recovery Coordinator Name is used only during a recovery process. Each server has such a name. When a transaction is established on a server by the Root's or a Subordinate's TM, the Superior's Recovery Coordinator Name must be identified. Therefore, when the TM on a server sends out a propagation context, it will include its own Recovery Coordinator Name. The Subordinate saves this name in a persistent store for a recovery process to use.

During the recovery process, the Server's TM goes to the persistent store to get the Recovery Coordinator Name. When the TM needs to re-synchronize with its Superior to find out the final decision for ending the transaction it uses this Recovery Coordinator Name to get back the Superior's Resource Coordinator. The final decision to commit or rollback is made by the Superior's Resource Coordinator, or in the example, the Root's Resource Coordinator. If Recovery Coordinator Name is a NULL string, the server TM knows it is the root and it does not need to contact a Superior to get the outcome decision.

Figure 6:
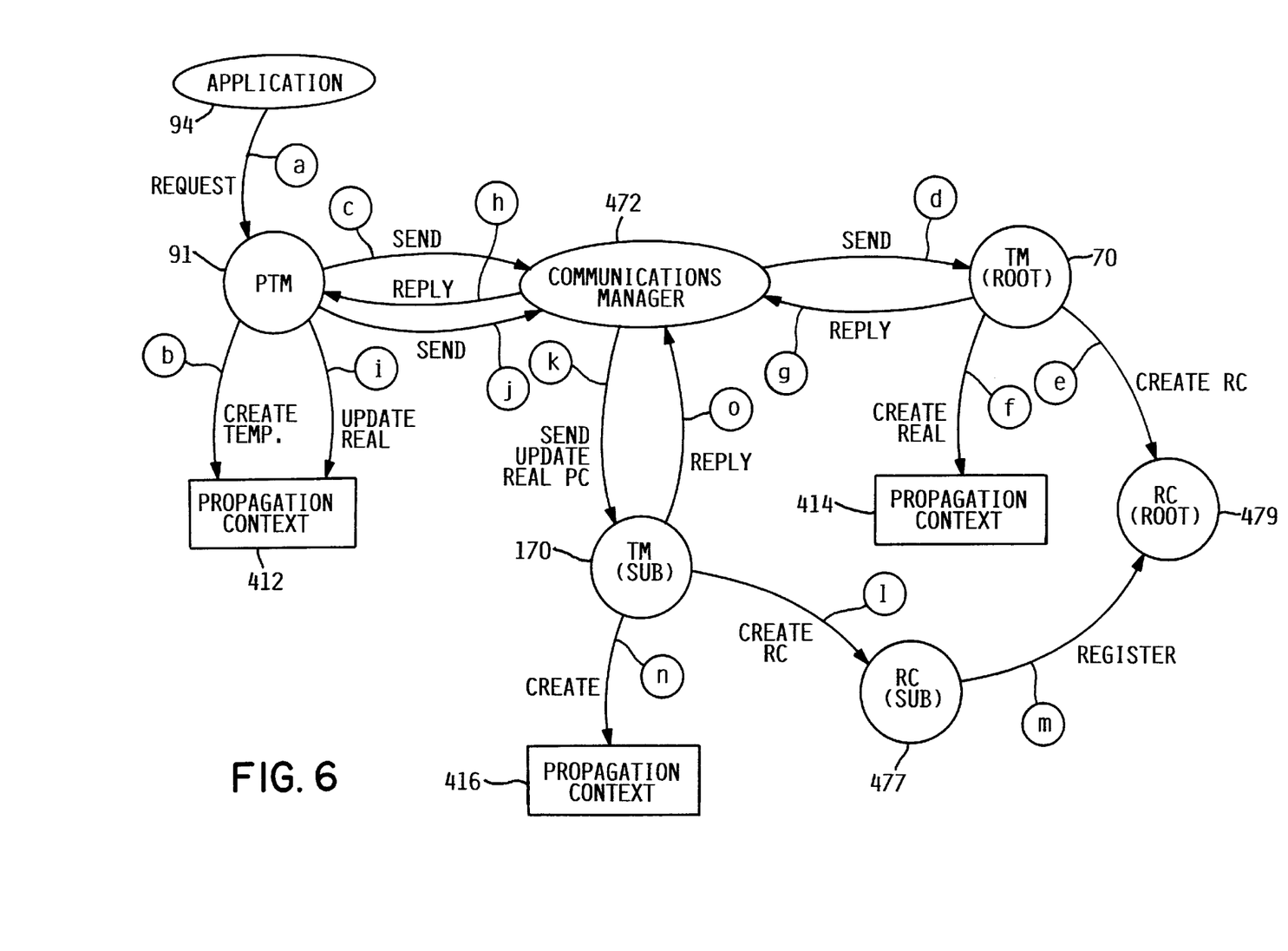
FIG. 6 is a combined data flow and state diagram showing the participation of the thin client in a global transaction that is started by the thin client and which uses the two-phase commit procedure.

Description of Procedure for including a PTM supported Client in Global Transaction wherein Two-Phase Commit protocol is supported by Root TM Referring to FIG. 6, a combination data flow and state diagram shows the method of this invention including the pseudo-registration process carried out by the OTM 73 and PTM 91 of the present invention. For the sake of simplicity, server system 200 is not included in the example illustration; however, one skilled in the art will recognize that any number of remote servers could be included in a global transaction including client application 94, as now discussed. Also for the sake of simplicity, only one communications manager 472 is shown, it represents the collective communications function of CM 72, 172, and 92 which each communicate with each other respective CM.

A global transaction begins with the command Begin_Transaction from Application 94 which Requests PTM 91 to begin a global transaction, shown along state/flow path a. Regarding terminology, the alphabetic labels (a–o) along each state/flow path a–o, indicate the preferred order of processing of commands and data involved with the global transaction. For example, path a, the Application's Request to begin a global transaction occurs preferably before the Create temporary propagation context command along path b. The label for each path c–o will only be discussed when necessary to avoid confusion. Returning to the state diagram, the PTM 91 responds to the Application's Request, by creating a temporary propagation context 412. Each propagation context described with reference to FIG. 6 is identical to general propagation context 400, with the exception that each data field contains a certain value that is specific to whether the context is temporary or real, as described below. The temporary propagation context 412 contains the Global ID field 402 which identifies the global transaction that is now begun. The Resource Coordinator Proxy field 404 is set to Null to indicate to the first server's TM (TM 70) receiving the propagation context that it is the Root TM. The Null value serves as a flag for the first server receiving the temporary context. In a preferred embodiment, the Recovery Coordinator Name field 406 is used as described above. The field is set to Null in the temporary propagation context created by PTM 91.

Once the global transaction is established by PTM, the application executes the first remote operation on a remote server. The temporary propagation context is then to be sent to communications manager 472 and then to Root TM 70 (paths c and d). The Root TM then creates a Resource Coordinator or RC 479, and Recovery Coordinator, and creates a real propagation context (path f) to send back in the form of a reply (path g) to the communications manager and back (path h) to PTM 91. The real propagation context 414 includes the same Global ID, but upon recognition of the Null value in the Resource Coordinator Proxy field, the TM 70 changes the field to include its own Resource Coordinator's Proxy. The TM 70 replaces the Recovery Coordinator Name field value changing it from Null to a value that indicates its own Recovery Coordinator Name.

In general, when a transaction is established on a server in environment 10, it must include a propagation context that identifies the Recovery Coordinator for the recovery process. As stated above, this requirement is met by TM 70 including its own Recovery Coordinator Name in the real propagation context.

When the real propagation context is received at PTM 91, it updates its own propagation context with the real propagation context (state path i). A new request from the application is sent (path j) to communications manager 472, which then sends the update real propagation context (path k) to Subordinate TM 170 which creates its own identical real propagation context (path n) and subordinate Resource Coordinator and Recovery Coordinator for handling a recovery process. Resource Coordinator 477 then registers (path m) with Root Resource Coordinator 479 as a subordinate, since the superior Resource Coordinator Proxy field also identifies TM 70 as the Root TM. A reply is then sent to Communications Manager 472 that the Subordinate TM 170 on the subordinate server 100 is participating in the global transaction which includes resources from Root Server 56, and Subordinate Server 100. Other Subordinates (not shown) could also participate in the transaction.

In summary, when a new transaction is started from a client application, the PTM 91 generates a unique Global Transaction ID to associate with this new transaction. When the first remote operation is executed, a temporary transaction context is sent to a remote server with a flag to indicate that server will become the Root Server upon receipt and execution at its transaction manager or TM 70, in the example above. The actual transaction is begun when the first remote method is executed at Root TM 70. Upon reply of the remote method, the TM 70 sends back the real transaction context which contains fields identifying the proxy for the Resource Coordinator (RC 74). The PTM 91 then replaces its own temporary transaction context with the real transaction context. This transaction context, using the Global ID generated by PTM 91 in the first place, is used to coordinate the rest of remote operations for this transaction. The real context containing the Global ID generated by the thin client is used by the PTM, but the remote server including the Root Recovery Coordinator manages the two-phase commit procedure. Thus, the thin client is able to start and coordinate a global transaction and any objects involved in the transaction are committed to remote servers using the two-phase commit procedure. Any other remote servers participating in the transaction receive the real context from the PTM and then registers to its Superior Resource Coordinator, which in the example is at the Root Server. Otherwise when a server makes a remote call to another server, it passes the real propagation context. Without the PTM and OTM of this invention, any prior art client must have a reliable and recoverable persistent store in order to start and participate in a two-phase global transaction. The present invention allows thin clients, not having such a reliable and recoverable persistent store to participate in such transactions for the first time.

As described above, aspects of the present invention pertain to specific method steps implementable on computer systems. In an alternative embodiment, the invention may be implemented as a computer program-product for use with a computer system. The programs defining the functions of the present invention can be delivered to a computer via a variety of signal-bearing media, which may be recordable-type media and transmission-type media. Examples of recordable-type media include, but are not limited to: (a) information permanently stored on non-writeable storage media (e.g., read-only memory devices within a computer, such as ROM 62 or CD-ROM disks readable by a media drive 65); and (b) alterable information stored on writeable storage media (e.g., floppy disks within a media drive 65). Examples of transmission-type media include conventional computer, cable, or telephone networks, including wireless communications. Therefore, it should be understood that such signal-bearing media, when carrying computer readable instructions that direct the method functions of the present invention, represent alternative embodiments of the present invention.

Other embodiments and configurations may occur to those skilled in the art in view of these teachings. For example, the logic module may be implemented as hardware or a combination of hardware and software (i.e., firmware), rather than in the preferred embodiment of only software code.

Therefore, the spirit and scope of this invention is not to be limited by anything other than the appended claims and their equivalents.

What is claimed is:

1. A method for allowing a thin client workstation to participate in a global transaction in a distributed transaction processing environment, the method comprising the steps of:

an application on a thin client workstation requesting to begin a global transaction;

in response to receiving the request, generating a unique global transaction identifier (Global ID) to associate with the global transaction;

in response to execution of a remote method on a remote server, sending a temporary transaction propagation context to the remote server supporting a two-phase commit protocol, the temporary transaction context including the Global ID and a flag to indicate that the remote server will become the Root server, said Root server modifying said temporary transaction propagation context;

receiving a real propagation context from the Root server;

replacing the temporary context with a real propagation context at the thin client; and using the real transaction propagation context containing the Global ID generated by the thin client to coordinate a global transaction.

2. The method of claim 1, further comprising the steps of:

after the step of sending a temporary transaction context, beginning a global transaction at the Root server upon receipt of the temporary transaction propagation context; and before replacing the temporary propagation context with the real propagation context, the Root server creating a Resource Coordinator and sending a reply to the thin client with a real transaction propagation context containing the Global ID, a Resource Coordinator Proxy, and a Recovery Coordinator Name useful for coordinating a recovery process.

3. The method of claim 2, further comprising the step of:

carrying out a two-phase commit procedure managed at the Root server.

4. The method of claim 2, further comprising the step of:

the thin client sending the real propagation context to at least one other remote server in order to involve objects from the at least one other remote server in the global transaction.

5. The method of claim 4, further comprising the step of:

the at least one other remote server registering with its Superior server.

6. The method of claim 5, wherein the remote server's Superior server is the Root server.

7. The method of claim 6, wherein each remote server includes a resource manager and further comprising the step of the at least one other remote resource manager selectively replying to the thin client or to the Root server in order to provide access to its objects for the global transaction.

8. The method of claim 7, further comprising the step of:

carrying out a two-phase commit procedure managed at the Root server.

9. A system for allowing a thin client workstation to participate in a global transaction in a distributed transaction processing environment, the system comprising:

a remote server having main memory, and a transaction manager (TM) and recovery coordinator operating in the remote server's main memory, wherein the TM supports a two-phase commit protocol;

a thin client having main memory, and an application program and a pseudo-transaction manager (PTM) operational in the thin client's main memory, the PTM being configured for communicating with the remote server's TM to perform the executed steps of:

responding to receiving a request from an application on a thin client workstation begin a global transaction, by generating a unique global transaction identifier (Global ID) to associate with the global transaction;

in response to execution of a remote method on the remote server, sending a temporary transaction propagation context to the remote server supporting a two-phase commit protocol, the temporary transaction context including the Global ID and a flag to indicate that the remote server will become the Root server, said Root server modifying said temporary transaction propagation context;

receiving a real propagation context from the Root server;

replacing the temporary context with a real propagation context at the thin client; and using the real propagation context containing the Global ID generated by the thin client to coordinate a global transaction.

10. The system of claim 9, wherein the TM at the remote server is configured for performing the computer-executed steps of:

after the step of the PTM sending a temporary transaction context, beginning a global transaction at the Root server upon receipt of the temporary transaction propagation context; and before the PTM replaces the temporary propagation context with the real propagation context, creating a Resource Coordinator and sending a reply to the thin client with a real transaction propagation context containing the Global ID, a Resource Coordinator Proxy, and a Recovery Coordinator Name useful for coordinating a recovery process.

11. The system of claim 10, wherein the TM at the remote server is configured for performing the computer-executed step of:

carrying out a two-phase commit procedure managed at the Root server.

12. The system of claim 10, wherein the system further includes at least one other remote server having main memory and a second transaction manager (TM) operating in its main memory, and the PTM is further configured for performing the computer-executed step of sending the real propagation context to at least one other remote server's (TM) in order to involve objects from the at least one other remote server in the global transaction.

13. The system of claim 12, wherein the at least one other remote server's TM is configured for performing the computer-executed step of registering with its Superior server.

14. The system of claim 13, wherein the remote server's Superior server is the Root server.

15. The system of claim 14, wherein the at least one other remote server and the Root server each include a resource manager that is configured for performing the computer-executed step of selectively replying to the thin client or to the Root server in order to provide access to its objects for the global transaction.

16. The system of claim 15, the Root server's TM carrying out a two-phase commit procedure.

17. An apparatus for allowing a thin client workstation to participate in a global transaction in a distributed transaction processing environment, the apparatus comprising:

a first server including a processing unit and main memory in communication with the processing unit;

transaction manager logic operating in main memory of the first server, the transaction manager logic including an object transaction manager module that further includes a registration module, a commit module, and a pseudo-transaction manager interface, wherein the registration module includes computer-executable logic that enables it to register distributed object resources requested by a client application for a global transaction for being committable by a two-phase protocol, wherein the object resources are distributed among a plurality of servers including the first server and may also be distributed on a client, wherein at least one of the plurality of servers has a transaction manager supporting a two-phase commit protocol, and wherein the commit module includes computer-executable logic for committing the registered resources; and a thin client having main memory, and an application program and a pseudo-transaction manager (PTM) logic operational in the thin client's main memory, the PTM including an interface for communicating with the first server's PTM interface, the PTM further including a temporary propagation context creator and a real propagation context updater, wherein the temporary propagation context creator is configured for responding to receiving a request from the application program to begin a global transaction, by generating a unique global transaction identifier (Global ID) to associate with the global transaction, and creating and sending a temporary transaction action propagation context to the first server, the temporary transaction context including the Global ID and a flag to indicate that the remote server will become the Root server, and the real propagation context updater is configured for receiving a real propagation context from the first server and replacing the temporary context with a real propagation context, and the PTM is further configured for using the real transaction propagation context containing the Global ID to coordinate a global transaction.

18. A program-product for use in a computer system for allowing a thin client workstation to participate in a global transaction in a distributed object-oriented transaction processing environment, the program product comprising:

A. a transaction manager (TM) module for operating at a first server, the TM module including a registration module, a commit module, and an interface to a pseudo-transaction manager module, wherein:

i. the registration module is configured to register distributed object resources requested by a thin client application for a global transaction for being committable by a two-phase protocol, wherein the object resources are distributed among a plurality of servers including the first server, wherein at least one of the plurality of servers has a transaction manager supporting a two-phase commit protocol;

ii. the commit module is configured to commit the registered resources; and iii. the interface is configured to communicate; and B. a pseudo-transaction manager (PTM) module for operating at a thin client, the PTM module including a temporary propagation context creator module, a real propagation context updater module, an interface to the TM module, wherein:

i. the temporary propagation context creation module is configured to respond to receiving a request from an application program to begin a global transaction, by generating a unique global transaction identifier (Global ID) to associate with the global transaction, and the temporary propagation context creation module is further configured for creating and sending a temporary transaction action propagation context to a remote server, the temporary transaction context including the Global ID and a flag to indicate that the remote server will become the Root server; and ii. the real propagation context updater module is configured to receive a real propagation context from the Root server and replace the temporary context with the real propagation context, such that the real propagation context containing the Global ID may be used by the PTM to coordinate a global transaction; and C. single-bearing media containing the TM module and the PTM module.

* * * * *